United States Patent
Wei et al.

(10) Patent No.: US 8,150,789 B2
(45) Date of Patent: Apr. 3, 2012

(54) TRANSPARENT PARALLELISM AMONG LINEAR SOLVERS

(75) Inventors: Min Wei, Redmond, WA (US); Alexander Sasha Stojanovic, Redmond, WA (US); David Lao, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 12/345,060

(22) Filed: Dec. 29, 2008

(65) Prior Publication Data

US 2010/0169257 A1 Jul. 1, 2010

(51) Int. Cl.
*G06F 17/00* (2006.01)
*G06N 5/02* (2006.01)

(52) U.S. Cl. ............... 706/46; 718/102; 717/149
(58) Field of Classification Search .......... 706/46
See application file for complete search history.

(56) References Cited

U.S. PATENT DOCUMENTS

| | | | |
|---|---|---|---|
| 7,343,355 B2 | 3/2008 | Ivanov et al. | |
| 8,024,708 B2* | 9/2011 | Demetriou et al. | 717/124 |
| 2003/0187773 A1 | 10/2003 | Santos et al. | |
| 2005/0166193 A1 | 7/2005 | Smith et al. | |
| 2008/0168017 A1 | 7/2008 | Sreedhar et al. | |

FOREIGN PATENT DOCUMENTS

WO 2007143150 A2 12/2007

OTHER PUBLICATIONS

Houstis, et al., "On the Future of Problem Solving Environments", Retrieved at <<http://www.cs.purdue.edu/homes/jrr/pubs/kozo.pdf>>, Mar. 30, 2000, pp. 1-78.
Kazi, et al., "Strategic Roadmaps and Implementation Actions for ICT in Construction", Retrieved at <<http://cic.vtt.fi/projects/stratcon/stratcon_final_report.pdf>>, 2007, pp. 158.
"TK Solver", Retrieved at <<http://en.wikipedia.org/wiki/TK_Solver>>, Oct. 29, 2008, pp. 3.
Stillman, Aaron James, "Model Composition within the Mobius Modeling Framework", Retrieved at <<http://www.perform.csl.uiuc.edu/Papers/USAN_papers/99STI01.pdf>>, 1999, pp. 73.

(Continued)

*Primary Examiner* — Omar Fernandez Rivas
*Assistant Examiner* — Kalpana Bharadwaj
(74) *Attorney, Agent, or Firm* — Capitol City TechLaw; Richard C. Irving (57) ABSTRACT

A model, which defines a mathematical problem, and multiple directives may be received. Each of the multiple directives may be mapped to a respective linear solver instance. The linear solver instances may be launched to execute in parallel. Each of the linear solver instances may use either a primal or a dual algorithm and may further use double arithmetic, exact arithmetic, or hybrid arithmetic, as specified by corresponding ones of the multiple directives. A linear solver instance that uses hybrid arithmetic may start by using double arithmetic and may use exact arithmetic after experiencing a numerical difficulty. After the numerical difficulty is resolved, the linear solver instance that uses hybrid arithmetic may restart and continue to solve the mathematical problem using double arithmetic. After one of the linear solver instances finds an optimal solution, others of the linear solver instances may be stopped and a report may be provided.

17 Claims, 4 Drawing Sheets

OTHER PUBLICATIONS

Epelly, et al., "An Interior Point Solver for Smooth Convex Optimization with an Application to Environmental-Energy-Economic Models", Retrieved at <<http://www.maths.ed.ac.uk/~gondzio/reports/nlphopdm.pdf>>, Jul. 2000, pp. 1-27.

"gPROMS Introductory User Guide", Retrieved at <<http://www.eng.jcu.edu.au/Current%20Students/general/downloads/gPROMS/introductory_guide_231.pdf>>, Process Systems Enterprise Ltd., Jun. 2004, pp. 1-254.

* cited by examiner

TRANSPARENT PARALLELISM AMONG LINEAR SOLVERS

BACKGROUND

Solvers are executable code developed for providing solutions to problems represented as mathematical models. Some of the provided solutions may be optimized. Today, there are a number of different types of solvers for solving problems defined by different mathematical models. For example, a first type of solver is well-suited for solving problems defined by a linear model, a second type of solver is well-suited for solving problems defined by a quadratic model, a third type of solver is well-suited for solving problems defined by a mixed integer model, and a fourth type of solver is well-suited for solving constraint satisfaction problems defined by a model.

Linear solvers, such as, for example, simplex solvers, may solve mathematical problems, such as linear programming problems, using a number of different solution approaches. For example, in a first approach, a linear solver may attempt to solve a mathematical problem using a double arithmetic approach, and in a second approach, a linear solver may attempt to solve a mathematical problem using an exact arithmetic approach.

The double arithmetic approach may be computationally more efficient, but less accurate than the fine-grained approach. As a result, a linear solver using the double arithmetic approach may become stalled or cease to make progress toward a solution due to accumulating running errors. The running errors may occur due to inaccuracies with respect to how some numerical values may be represented in a processing device. A linear solver using the exact arithmetic approach may represent numerical values more accurately than a linear solver using the double arithmetic approach, and therefore, is less subject to problems regarding the accumulation of running errors. However, users may be unwilling or unable to wait an amount of time until the linear solver using the exact arithmetic approach computes a solution.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In various embodiments, multiple instances of linear solvers, such as simplex solvers, may be launched in parallel, transparently, according to multiple directives. For example, different combinations of simplex solver instances may be spawned simultaneously according to provided multiple directives. A user may specify a large set of directives to receive benefits of parallel execution. In one embodiment, the user may create various combinations of simplex solver instances running in parallel, including, but not limited to: a primal double simplex solver instance; a dual double simplex solver instance; a primal exact simplex solver instance; a dual exact simplex solver instance; a primal hybrid simplex solver instance; and a dual hybrid simplex solver instance.

In embodiments of a primal hybrid simplex solver, an instance of a simplex solver, may execute using a primal algorithm. The simplex solver may use a double arithmetic approach and the primal algorithm until experiencing a numerical difficulty, such as a stall. An exact arithmetic approach using the primal algorithm may then be used, along with basis information from the double arithmetic approach, to recover from the stall. After recovering from the stall, the instance of the simplex solver may be restarted, and after being restarted, may continue to solve a mathematical problem using the double arithmetic approach and the primal algorithm.

Similarly, in embodiments of a dual hybrid simplex solver, an instance of a linear solver, such as a simplex solver, may execute using a dual algorithm. The simplex solver may use a double arithmetic approach until experiencing a numerical difficulty, such as a stall. An exact arithmetic approach with the dual algorithm may then be used, along with basis information from the double arithmetic approach, to recover from the stall. After recovering from the stall, the instance of the simplex solver may be restarted, and after being restarted, may continue to solve a mathematical problem using the double arithmetic approach and the dual algorithm.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, one or more instances of linear solvers, such as simplex solvers, may be configured to solve a mathematical problem according to multiple user-provided directives. A user may transparently create various combinations of simplex solver instances running in parallel, including, but not limited to: a primal double simplex solver instance; a dual double simplex solver instance; a primal exact simplex solver instance; a dual exact simplex solver instance; a primal hybrid simplex solver instance; and a dual hybrid simplex solver instance. Primal and dual refer to a particular algorithm used by a solver and double, exact, and hybrid refer to a double arithmetic approach, an exact arithmetic approach, and a hybrid arithmetic approach, respectively.

A double arithmetic approach is an approach in which a solver instance uses double precision floating-point arithmetic to solve a problem. An exact arithmetic approach is an approach in which a solver instance uses rational arithmetic to solve a problem. A linear solver, such as a simplex solver, using a double arithmetic solution approach may be more subject to accumulating running errors than a linear solver using an exact arithmetic solution approach. Consequently, a linear solver using a double arithmetic solution approach is more likely to stall, or cease making progress toward a solution, than a linear solver using an exact arithmetic solution approach.

A primal hybrid solver instance may include a linear solver instance, such as a simplex solver instance, which may execute using a double arithmetic solution approach and an exact arithmetic solution approach. For example, the solver instance may use a primal algorithm and a double arithmetic solution approach until experiencing a numerical difficulty, such as a stall. When the stall is detected, the primal algorithm and an exact arithmetic solution approach, along with basis information from the double arithmetic approach, may be used by the silver instance to recover from the stall. After recovering from the stall, the solver instance may be restarted, and subsequently, may use the primal algorithm and the double arithmetic solution approach to continue to solve a mathematical problem.

A dual hybrid solver instance may include a linear solver instance, such as a simplex solver instance, which may execute using a double arithmetic solution approach and an exact arithmetic solution approach. For example, the solver instance may use a dual algorithm and a double arithmetic solution approach until a numerical difficulty is experienced, such as a stall. When the stall is detected, the dual algorithm and an exact arithmetic solution approach, along with basis information from the double arithmetic approach, may be used by the solver instance to recover from the stall. After recovering from the stall, the solver instance may be restarted, and subsequently, may use the dual algorithm with the double arithmetic solution approach to continue to solve a mathematical problem.

Exemplary Processing Device

Figure 1:
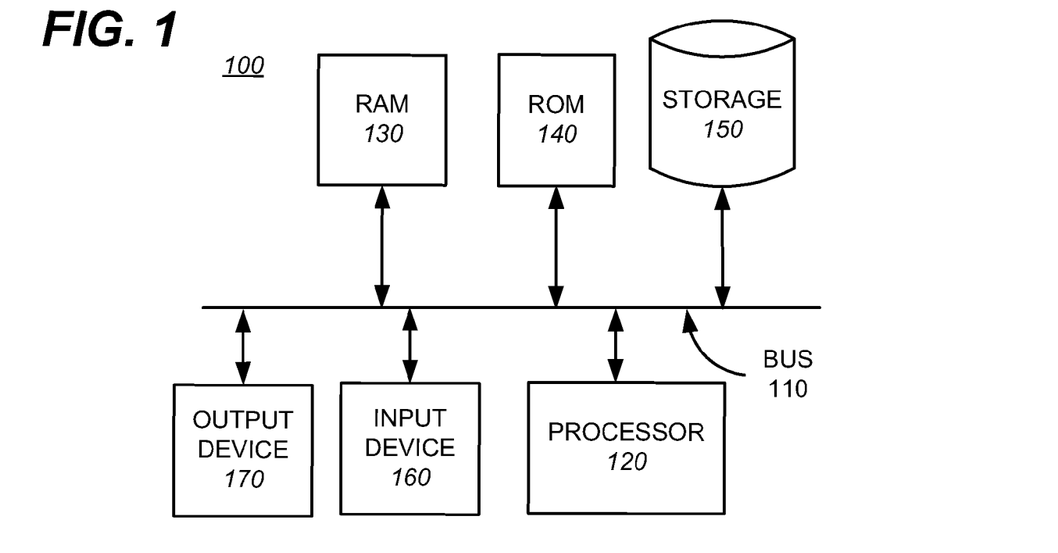
FIG. 1 is a functional block diagram of an exemplary processing device, which may be used to implement embodiments consistent with subject matter of this disclosure.

FIG. 1 is a functional block diagram of an exemplary processing device 100, which may be used to implement embodiments consistent with the subject matter of this disclosure. Processing device 100 may be a desktop personal computer (PC), a notebook or laptop PC, a server, or other processing device. Processing device 100 may include a bus 110, processor 120, a random access memory (RAM) 130, a read only memory (ROM) 140, a storage device 150, an input device 160, and an output device 170. Bus 110 may permit communication among components of processing device 100.

Processor 120 may include one or more conventional processors or microprocessors that interpret and execute instructions. A memory may include RAM 130, ROM 140, or another type of dynamic or static storage device that stores information and instructions for execution by processor 120. RAM 130, or another type of dynamic storage device, may store instructions as well as temporary variables or other intermediate information used during execution of instructions by processor 120. ROM 140, or another type of static storage device, may store static information and instructions for processor 120. Storage device 150 may include a hard disk and corresponding drive, a flash-based storage device, or other type of storage device or medium for storing data and/or instructions for processor 120.

Input device 160 may include a keyboard, a pointing device, an electronic pen, or other device for providing input. Output device 170 may include a display, a printer, or other device for outputting information.

Processing device 100 may perform functions in response to processor 120 executing sequences of instructions contained in a tangible machine-readable medium, such as, for example, RAM 130, ROM 140, storage device 150 or other medium. Such instructions may be read into RAM 130 from another machine-readable medium or from a separate device via a communication interface (not shown).

Functional Block Diagram

Figure 2:
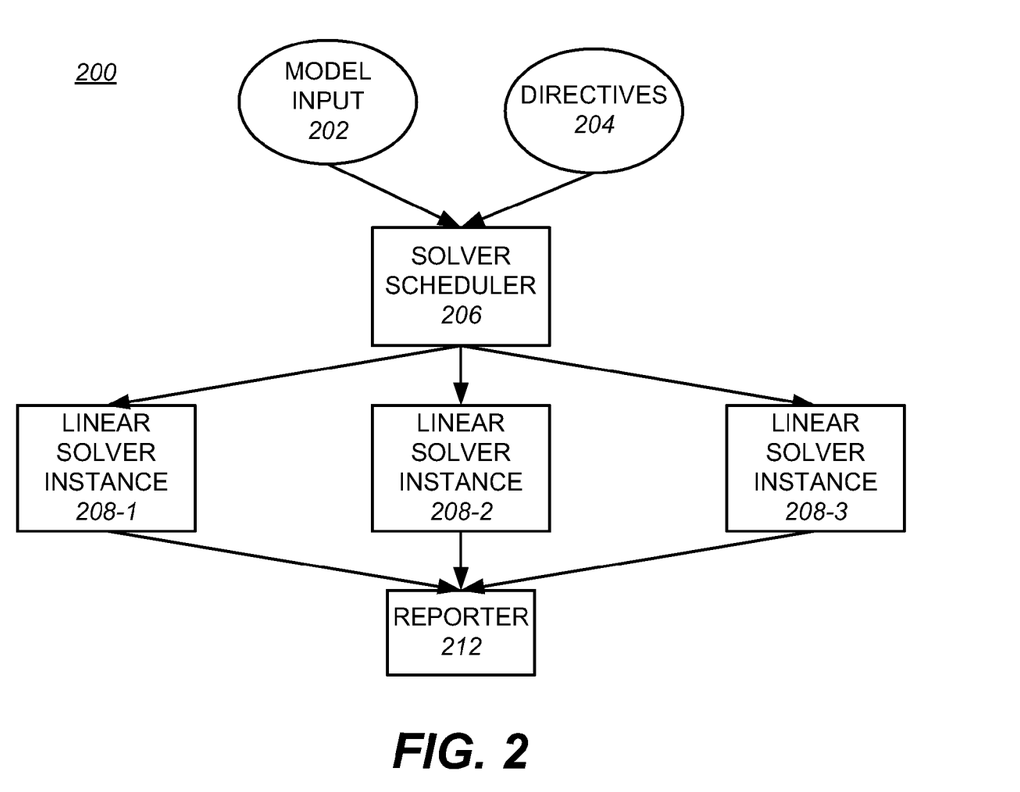
FIG. 2 is a functional block diagram of components of an embodiment consistent with the subject matter of this disclosure.

FIG. 2 illustrates a functional block diagram 200 of an exemplary embodiment 200. Exemplary embodiment 200 may include model input 202, directives 204, solver scheduler 206, linear solvers 208-1, 208-2, 208-3, and reporter 212.

Model input 202 may define a mathematical model representing a problem to be solved. Directives 204 may include one or more directives, which may provide information for configuring linear solvers to solve a problem, whether multiple linear solvers are to be used to solve a problem, a respective solution approach to be used for each of the linear solvers, an algorithm to use, such as, for example, primal, dual, or other algorithm, as well as other information.

Solver scheduler 206 may receive model input 202 and directives 204. If directives 204 indicate that multiple linear solvers, such as, for example, multiple simplex solvers, are to be used to solve a problem, such as, for example, a linear programming problem, then solver scheduler 206 may map each directive to a linear solver instance. As an example, a number of directives may be mapped, respectively, to a primal double linear solver instance, a dual double linear solver instance, a primal exact linear solver instance, or a dual hybrid linear solver instance.

In embodiment 200, solver scheduler 206 may schedule three linear solver instances, as directed by directives 204, such as, for example, linear solver instances 208-1, 208-2, and 208-3.

When a linear solver instance finds an optimal solution, other linear solver instances may be stopped and the optimal solution may be provided to reporter 212, which may generate a solution report.

Embodiment 200 is only exemplary. In other embodiments, as few as one linear solver instance, or many linear solver instances may be transparently launched to execute in parallel. Further, in some embodiments, model input 202 and directives 204 may be provided to a solver scheduler via an application program interface (API) from an application. For example, an application such as a spreadsheet application, or other application, may provide model input 202 and directives 204 to solver scheduler 206, which may transparently launch one or more linear solver instances, such as, simplex solver instances, to transparently execute in parallel to solve a mathematical problem, such as, for example, a linear programming problem.

Exemplary Processing

Figure 3:
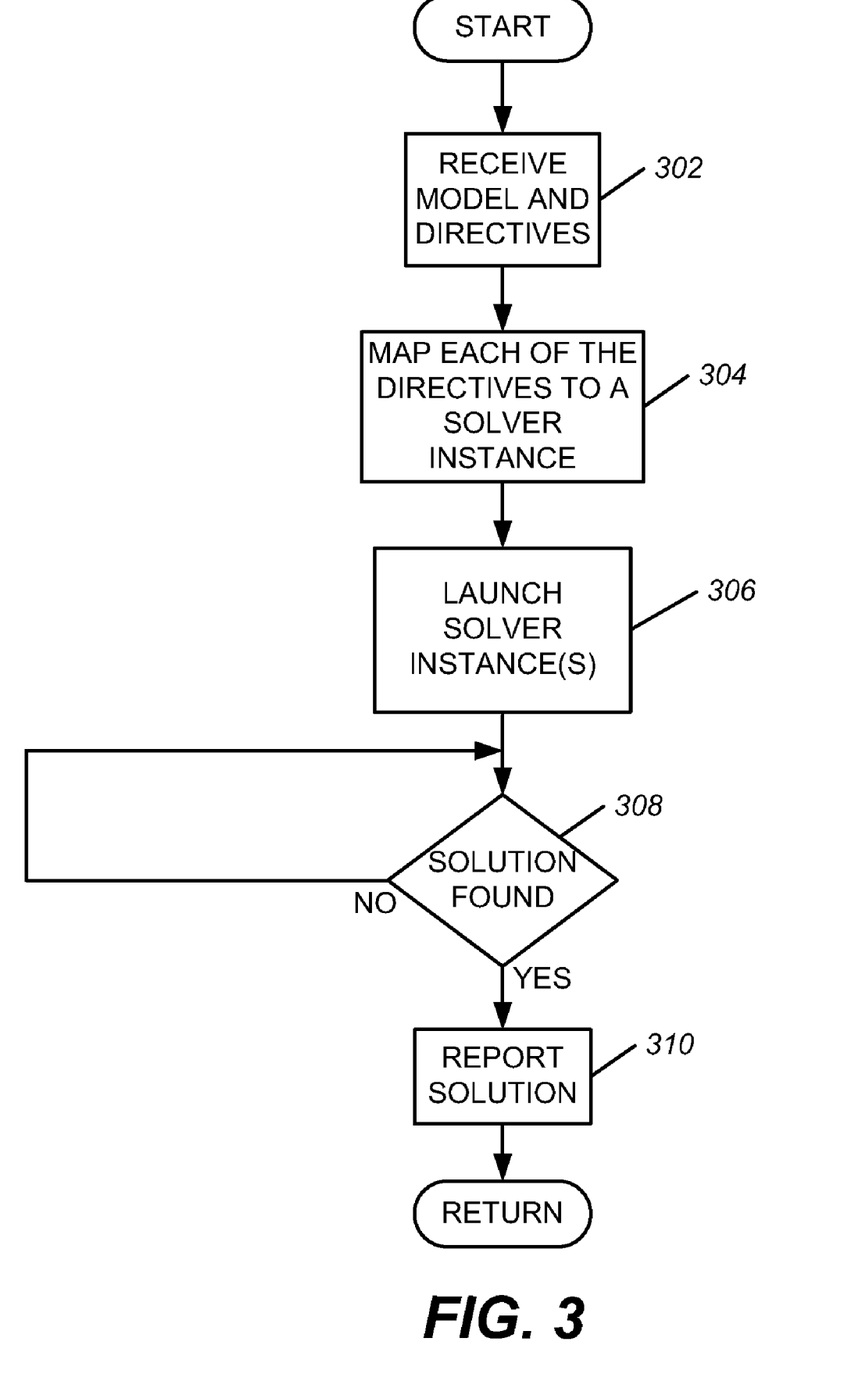
FIG. 3 illustrates a flowchart of an exemplary process for mapping directives to linear solver instances and transparently launching the linear solver instances to execute in parallel.

FIG. 3 is a flowchart of an exemplary process that may be performed in various embodiments. The process may begin with a solver scheduler receiving input defining a model and directives (act 302). The model may represent a linear programming problem, or other mathematical problem, and the directives may include information for solving the mathematical problem, as well as respective algorithms for one or more linear solvers, including, but not limited to, a primal algorithm, and a dual algorithm, and a solution approach, including but not limited to, double arithmetic, exact arithmetic, and hybrid arithmetic. The one or more linear solvers may be simplex solvers in some embodiments.

The solver scheduler may map each of the directives to a linear solver instance (act 304). The linear solver instances then may be launched, transparently, to execute in parallel (act 306). The solver scheduler may periodically check whether any of the linear solver instances found an optimal solution (act 308). When one of the linear solver instances finds an optimal solution, the optimal solution may be provided to a reporter, which may generate a solution report, and others of the linear solver instances may be stopped (act 310).

Figure 4:
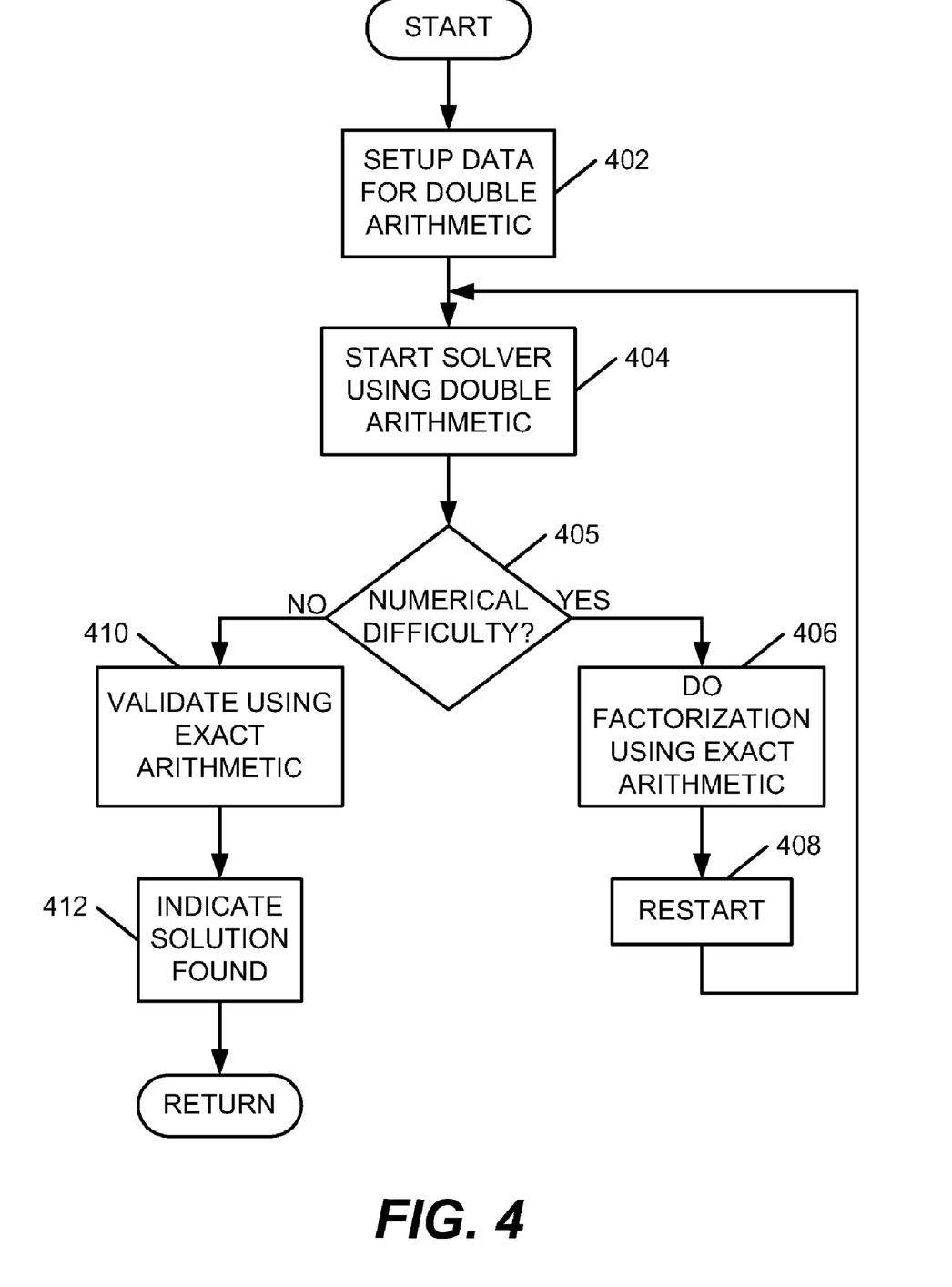
FIG. 4 is a flowchart illustrating an exemplary process performed by a linear solver instance that uses hybrid arithmetic.

FIG. 4 is a flowchart of an exemplary process for a linear solver instance, such as, for example, a simplex solver instance, using hybrid arithmetic. The process may begin by setting up data for double arithmetic use with respect to the linear solver instance (act 402). The linear solver instance may then be started using double arithmetic (act 404). Next, the linear solver instance may determine whether a numerical difficulty is being experienced (act 405). A numerical difficulty may be experienced when the linear solver instance is detected as being stalled.

Figure 5:
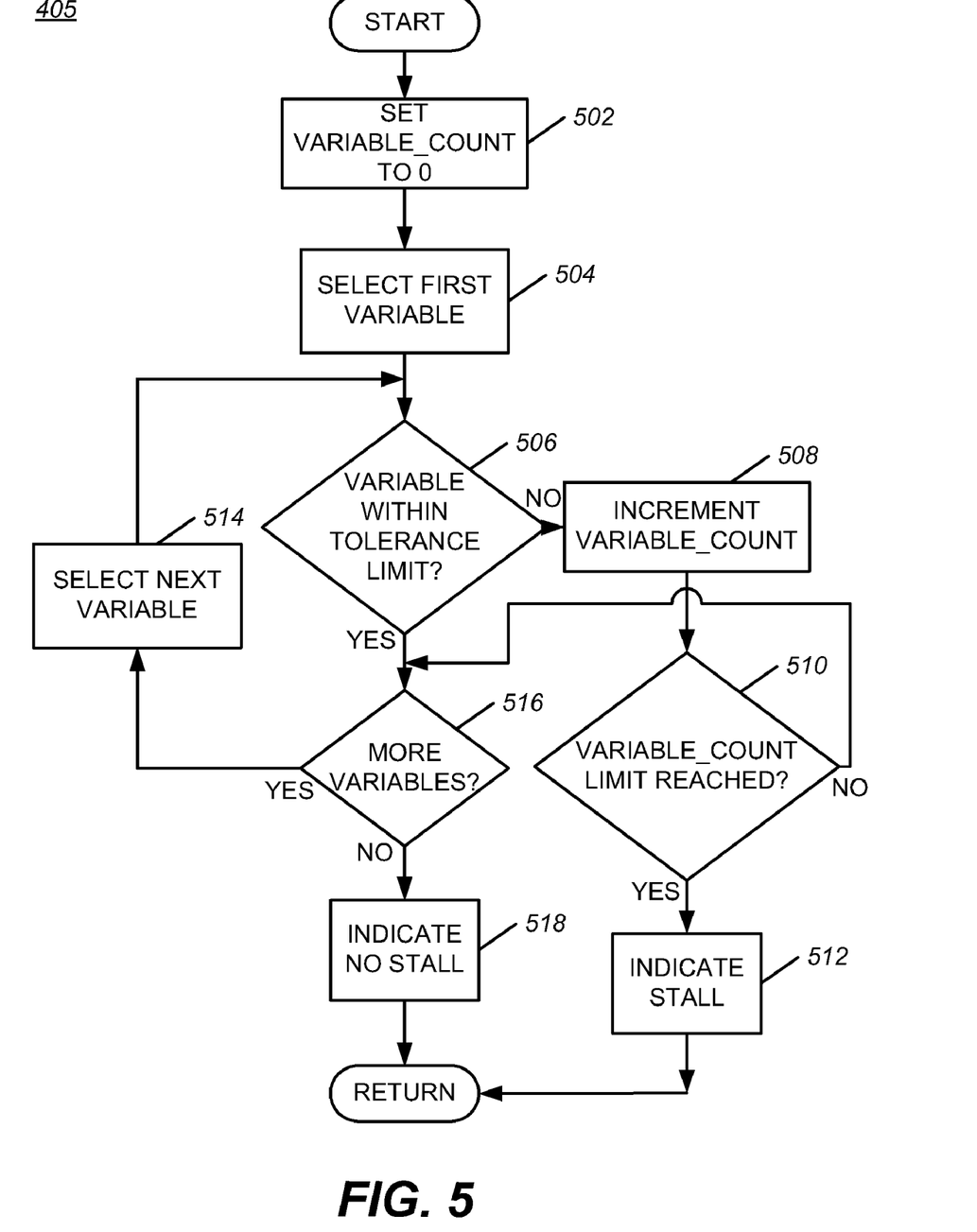
FIG. 5 is a flowchart illustrating an exemplary process for detecting whether a linear solver that uses hybrid arithmetic is stalled.

FIG. 5 is a flowchart of an exemplary process for performing act 405 to detect whether the linear solver instance is stalled. The process may be performed by a linear solver instance or another component of the processing device. The process may begin by setting a variable count to 0 (act 502). Next, a first variable of a model may be selected (act 504). The model may have, for example, hundreds or thousands of variables, if not more.

Next, a determination may be made regarding whether the selected variable is within a corresponding tolerance limit of a corresponding predefined range of values (act 506). For example, if the corresponding predefined range of values is 1 through 5, and the corresponding tolerance limit is 0.000001, then the selected variable is within the corresponding tolerance limit only when the selected variable has a value between 0.999999 and 5.000001.

If the selected variable is determined not to be within the corresponding tolerance limit, then the variable count may be incremented to count a number of variables not within respective tolerance limits (act 508). A determination may then be made regarding whether the variable count has reached a predefined limit (act 510). If the variable count has reached the predefined limit, then an occurrence of a stall may be indicated (act 512) and the process may be completed.

If during act 506, the selected variable is determined to be within the corresponding tolerance limit, or during act 510, the variable count is determined to not have reached the predefined limit, then a determination may be made regarding whether there are more variables to check (act 516). If so, a next variable may be selected and act 506 may be performed. Otherwise, the process may be completed.

The process illustrated by the flowchart of FIG. 5 is only exemplary. In other embodiments, variations of the process may be implemented. For example, the flowchart of FIG. 5 may indicate a stall only when a number of variables determined to be outside of respective predefined limits is greater than or equal to a predefined value, such as, for example, 100, or another value. In a second embodiment, if any of the variables are outside of a respective predefined limit, then a stall may be indicated. In a third embodiment, each of the variables of the model may have an associated assigned weight. When an accumulated weight of variables are outside of a predefined limit, a stall may be indicated.

Returning to FIG. 4, if, during act 405, the linear solver instance is detected as experiencing a numerical difficulty (i.e., stalled), then the linear solver instance may recover from the numerical difficulty by using exact arithmetic. For example, in various embodiments, the linear solver instance may perform factorization using exact arithmetic and a basis from using double arithmetic (act 406). After completing the factorization, the linear solver instance may be restarted (act 408) and act 404 again may be performed to start the linear solver instance using double arithmetic and an advanced basis, based on a basis provided after performing factorization using exact arithmetic.

If, during act 405, the linear solver instance is not detected as experiencing a numerical difficulty, then a solution of the linear solver instance may be validated using exact arithmetic (act 410). The linear solver instance may then indicate that an optimal solution was found (act 412).

CONCLUSION

The above-mentioned exemplary embodiments illustrate one or more linear solvers instances, such as, for example, simplex solver instances, which may transparently execute in parallel to solve a problem, such as a linear programming problem or other mathematical problem. A primal hybrid linear solver instance or a dual hybrid linear solver instance may benefit from both, a speed of a double arithmetic solution approach, and greater accuracy of an exact arithmetic solution approach.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not to be construed as limiting the claims in any way. Other configurations of the described embodiments are part of the scope of this disclosure. For example, in other embodiments, an order of acts performed by processes, such as the processes illustrated by FIGS. 3-5, may be different and/or may include additional or other acts. Additionally, in other embodiments, the processes illustrated by FIGS. 3-5 may be performed by a number of processing devices, which may communicate with one another via a network, and act as a single larger processing device.

Accordingly, the appended claims and their legal equivalents define embodiments, rather than any specific examples given.

We claim as our invention:

1. A machine-implemented method for transparently launching a plurality of linear solver instances in parallel, the machine-implemented method comprising:
   receiving a model and a plurality of directives for configuring multiple linear solver instances for solving a problem;
   mapping each of the plurality of directives to a respective one of the multiple linear solver instances; and
   transparently launching the multiple linear solver instances to execute in parallel, wherein:

a linear solver instance using hybrid arithmetic performs a method comprising:
  starting to solve a mathematical problem using double arithmetic,
  determining whether the linear solver instance is experiencing a numerical difficulty,
  using exact arithmetic when the linear solver instance experiences the numerical difficulty, and
  restarting the linear solver instance to use the double arithmetic after the using of the exact arithmetic; and
the machine-implemented method is performed by at least one processor of a processing device.

2. The machine-implemented method of claim 1, wherein the multiple linear solver instances are multiple simplex solver instances.

3. The machine-implemented method of claim 2, further comprising:
  reporting an optimal solution, when the optimal solution is found by one of the multiple linear solver instances; and
  stopping execution of others of the multiple linear solver instances after the one of the multiple linear solver instances reports the optimal solution.

4. The machine-implemented method of claim 3, wherein the multiple linear solver instances include at least one linear solver instance selected from a group including a primal double linear solver instance, a dual double linear solver instance, a primal exact linear solver instance, a dual exact linear solver instance, a primal hybrid linear solver instance, and a dual hybrid linear solver instance.

5. The machine-implemented method of claim 1, wherein after the linear solver instance using the hybrid arithmetic is determined not to be experiencing the numerical difficulty, the machine-implemented method further comprises:
  validating, using the exact arithmetic, an optimal solution found by the linear solver instance using the hybrid arithmetic, and
  indicating that the optimal solution is found.

6. The machine-implemented method of claim 1, wherein the linear solver instance experiences the numerical difficulty when stalled.

7. A processing device comprising:
  at least one processor; and
  a memory connected to the at least one processor, the memory comprising:
    instructions for mapping a received directive to a simplex solver instance that uses hybrid arithmetic,
    instructions for launching the simplex solver instance to solve a mathematical problem defined by a received model, the simplex solver instance using double arithmetic when starting,
    instructions for detecting whether the simplex solver instance is experiencing a numerical difficulty,
    instructions for the simplex solver instance to perform factorization using exact arithmetic after the simplex solver instance is detected as experiencing the numerical difficulty, and
    instructions for restarting the simplex solver instance to use the double arithmetic after the simplex solver instance performs factorization using the exact arithmetic.

8. The processing device of claim 7, wherein the simplex solver instance uses the double arithmetic until the numerical difficulty is experienced.

9. The processing device of claim 7, wherein the memory further comprises:
  instructions for mapping a received plurality of directives to respective simplex solver instances,
  instructions for transparently launching the simplex solver instances to execute in parallel to solve the mathematical problem, and
  instructions for reporting an optimal solution found by one of the simplex solver instances.

10. The processing device of claim 9, wherein the memory further comprises:
  instructions for stopping execution of others of the simplex solver instances after the optimal solution is found by the one of the simplex solver instances.

11. The processing device of claim 7, wherein:
  each of the simplex solver instances uses an algorithm selected from a group comprising a primal algorithm and a dual algorithm, and
  each of the simplex solver instances uses a solution approach selected from a group comprising the double arithmetic, the exact arithmetic, and the hybrid arithmetic.

12. A dynamic or static storage device for storing information having recorded thereon instructions for at least one processor of a processing device, the instructions comprising:
  instructions for mapping each of a plurality of directives to a respective one of a plurality of linear solver instances;
  instructions for transparently launching the plurality of linear solver instances to execute in parallel to solve a mathematical problem defined by a model; and
  instructions for validating, using exact arithmetic, a solution found by a linear solver instance that uses hybrid arithmetic.

13. The dynamic or static storage device of claim 12, wherein the instructions further comprise:
  instructions for stopping execution of others of the plurality of linear solver instances after one of the plurality of linear solver instances indicates finding of an optimal solution.

14. The dynamic or static storage device of claim 12, wherein:
  each of the linear solver instances is a respective simplex solver instance, and
  each of the simplex solver instances includes a primal double simplex solver instance, a primal exact simplex solver instance, a primal hybrid simplex solver instance, a dual double simplex solver instance, a dual exact simplex solver instance, or a dual hybrid simplex solver instance.

15. The dynamic or static storage device of claim 12, wherein the instructions further comprise:
  instructions for launching a linear solver instance that uses the hybrid arithmetic.

16. The dynamic or static storage device of claim 12, wherein the instructions further comprise:
  instructions for starting the linear solver instance that uses the hybrid arithmetic, such that double arithmetic is used,
  instructions for determining whether the linear solver instance that uses the hybrid arithmetic is experiencing a stall,
  instructions for the linear solver instance that uses the hybrid arithmetic to use the exact arithmetic after detecting that the linear solver instance that uses the hybrid arithmetic is experiencing the stall, and
  instructions for the linear solver that uses the hybrid arithmetic to restart and use the double arithmetic after using the exact arithmetic.

17. The tangible machine readable medium dynamic or static storage device of claim 12, wherein each of the linear solver instances is a simplex solver instance that uses either a primal algorithm or a dual algorithm.

* * * * *

UNITED STATES PATENT AND TRADEMARK OFFICE
CERTIFICATE OF CORRECTION

PATENT NO. : 8,150,789 B2
APPLICATION NO. : 12/345060
DATED : April 3, 2012
INVENTOR(S) : Wei et al.

Page 1 of 1

It is certified that error appears in the above-identified patent and that said Letters Patent is hereby corrected as shown below:

In column 8, line 60, in Claim 17, after "The" delete "tangible machine readable medium".

Signed and Sealed this
Ninth Day of October, 2012

David J. Kappos
*Director of the United States Patent and Trademark Office*